Aug. 16, 1955　　　H. W. NORTH　　　2,715,477
CLOSURES
Filed May 18, 1953　　　　　2 Sheets-Sheet 1

INVENTOR
Henry W North
BY Ralph Hamma
ATTORNEY

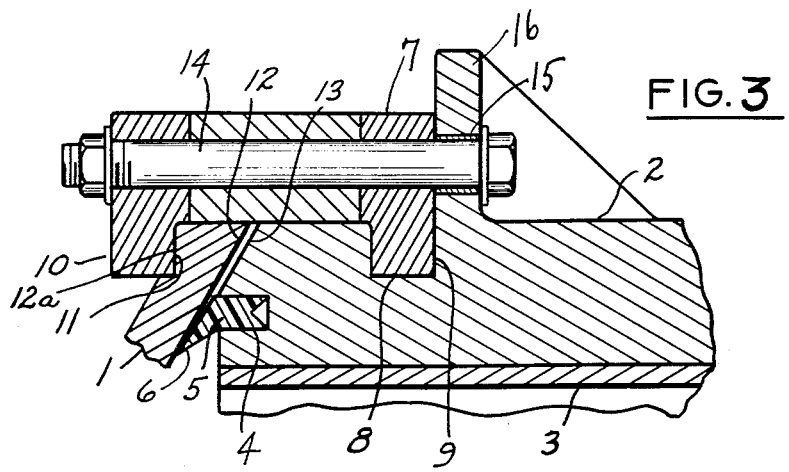
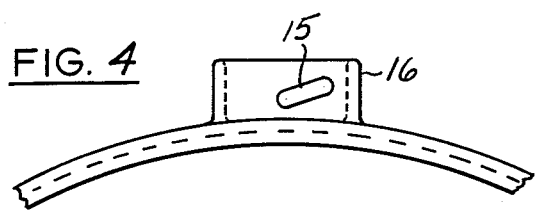
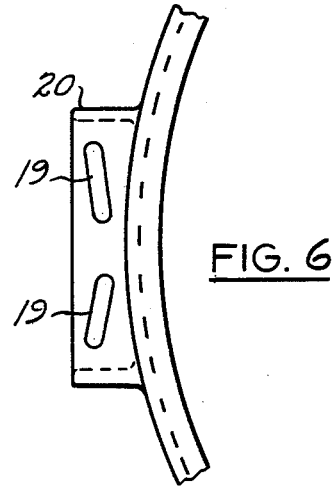
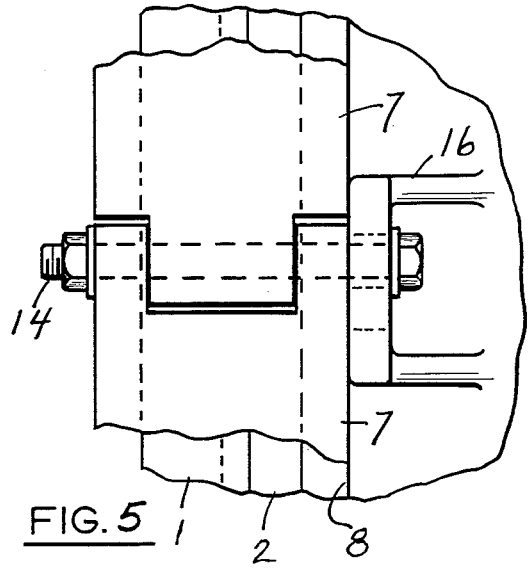

United States Patent Office 2,715,477
Patented Aug. 16, 1955

2,715,477

CLOSURES

Henry W. North, Erie, Pa., assignor to Dravo Corporation, Pittsburgh, Pa., a corporation of Pennsylvania Application May 18, 1953, Serial No. 355,428

2 Claims. (Cl. 220—55)

This invention is intended to provide a closure for pressure vessels in which the rim of the cover has a dovetail interlock with the peripheral edge of vessels. By anchoring the rim of the cover to the vessel, the bursting strength is increased. In a preferred form, the cover has an abrupt radial shoulder on its outer surface and the inner surface of the rim diverges from the shoulder and mates with a beveled surface on the peripheral edge of the vessel. A clamping ring cooperating with the shoulder provides a dovetail interlock between the rim of the cover and the vessel, which makes the cover more secure against over-pressure. The clamping ring may be made of hinged, channel-shaped sections supported so as to be cammed clear of the rim of the cover as the clamping tension is released.

Figure 1:
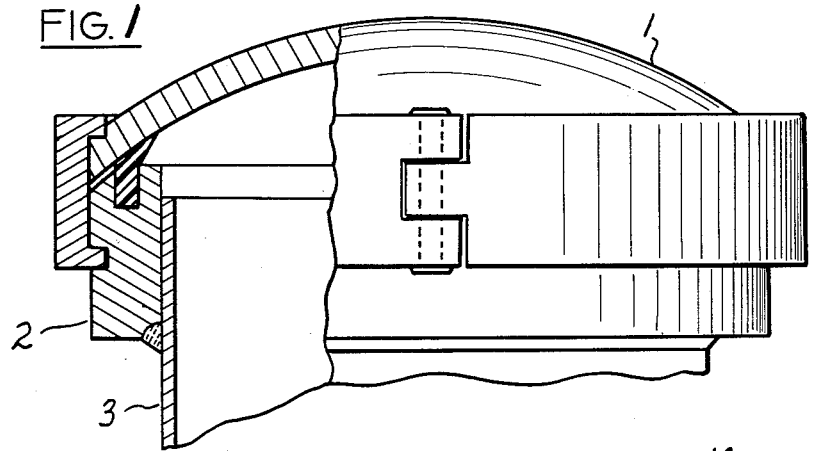
Figure 2:
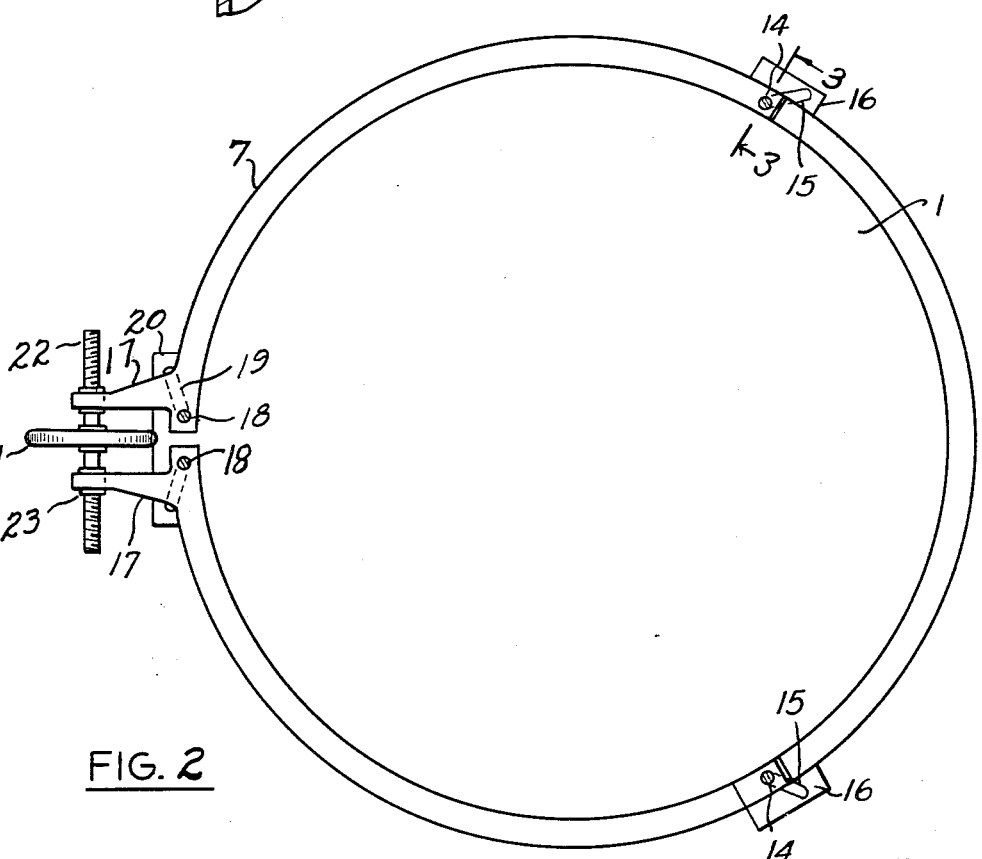

In the accompanying drawing, Fig. 1 is a fragmentary side elevation of a pressure vessel partly broken away; Fig. 2 is an end view; Fig. 3 is a section on line 3—3 of Fig. 2; Fig. 4 is an end view of one of the cam brackets; Fig. 5 is a fragmentary view of the locking ring and cover at the Fig. 4 bracket; and Fig. 6 is an end view of the cam brackets at the adjacent ends of the clamping ring.

The conventional parts of the pressure vessel are readily identified, 1 being the cover which closes an opening defined by a flange 2 welded to the outer wall 3 of the vessel. The flange has a groove 4 carrying a rubber sealing ring 5 having a flexible lip 6, which is forced into sealing engagement with the cover by the internal pressure within the vessel.

The cover is locked in the closed position by a split clamping ring made up of a plurality of hinged sections 7 of channel-shaped cross-section. As shown more clearly in Fig. 3, each of the sections 7 has a flange 8 which fits in a groove 9 in the flange 2 and a flange 10 which fits in a rabbet providing an abrupt shoulder 11 in the outer periphery of the cover 1. When the ring is in the locking position, shown in Fig. 3, the inclined inner surface 12 on the cover, which diverges from the shoulder 12a and mates with a complimentary beveled surface on seat 13 on the flange 2 and in conjunction with the abrupt shoulder 12a on the outer surface of the rim of the cover provides an interlock of dovetail radial cross section around the entire periphery of the cover 1, which positively anchors the rim of the cover to the flange 2 of the pressure vessel, and keeps the rim of the cover from being drawn inward clear of the flange 10 on the locking ring under the deflection of the cover from the internal pressure within the vessel. The inclined surface 12 of the cover, which provides a dovetail configuration, is substantially a direct continuation of the inner surface of the cover. Since the sealing action is provided by the rubber sealing ring 5, there can be sufficient clearance between the rim of the cover and the flanges of the locking ring so that the locking ring can easily be moved to and from the locking position.

When the locking ring is released, special provisions are necessary to move the hinged sections 7 away from the rim of the cover in order that all portions of the cover may be unlocked at the same time and the ring be clear of the cover so as not to interfere with the opening of the pressure vessel. This is effected by a pin and cam slot associated with each end of the locking ring sections 7. The hinge pins 14, which connect adjacent sections 7, fit in cam slots 15 in brackets 16 fixed to the flange 2. Brackets 17 fixed to adjacent ends of the split locking ring carry pins 18, which fit in cam slots 19 in a bracket 20. The cam slots 15 and 19 are so arranged that as the brackets 17 are spread apart by unloosening of the ring, each end of the ring sections 7 is cammed outward clear of the rim of the cover 1. In the outermost position, the flange 8 on the ring will also be clear of the groove 9 in the flange 2 on the pressure vessel, although this is not essential. In the loosened, or unlocked position, the cam slots 15 and 19 cooperate with the pins 14 and 18 to hold the clamping ring so that it will not interfere with the opening and closing of the cover 1.

When the cover has been closed, it can be locked by turning a hand-wheel 21 on a screw 22 in the direction to tighten the ring about the cover. The screw 22 has right and left-hand threads cooperating with nuts 23 in the brackets 17 so the brackets move toward or away from each other depending upon the direction in which the hand-wheel is turned.

By having cam means associated with each end of the hinged sections 4 of the split clamping ring, the ring is guided and supported at each point in its clamping and loosening movement and all parts of the ring will be clear of the cover when the ring is unclamped.

What is claimed as new is:

1. In a pressure vessel having a cover, a split locking ring having a plurality of hinged sections, said sections being of channel cross-section with the flanges extending inward, said vessel having a groove receiving one of the channel flanges and the other channel flange overlapping the cover in the locking position of the ring, means connecting the adjacent ends of the ring for bringing the ends together to clamp the ring about the cover and for spreading the ends apart to release the ring, and cam means cooperating with each end of the ring sections to cam the sections of the ring outward clear of the cover and groove as the adjacent ends of the ring are spread apart to release the ring.

2. In a pressure vessel having an opening with its inner edge projecting above its outer edge and connected by a bevelled portion providing a seat, a cover having a rim with an abrupt shoulder on its outward surface and an inner surface diverging from the shoulder to the outer part of the rim whereby the thickness of the rim increases toward the outer part of the rim, the rim having an inner surface complementary to and resting on the seat, and releasable retaining means extending from the vessel from below the seat up around the outer part of the seat and rim and inward over the abrupt shoulder on the rim to hold the rim of the cover against the seat, the seat cooperating with the inner surface of the rim to resist radial inward movement of the rim under bursting pressure.

References Cited in the file of this patent

UNITED STATES PATENTS

| 1,501,203 | Crossley | July 15, 1924 |

FOREIGN PATENTS

| 16,453 | Great Britain | of 1896 |
| 327,893 | France | Sept. 11, 1903 |
| | (1st Addition to No. 1,937) | |
| 980,614 | France | Dec. 27, 1950 |